United States Patent [19]

Vasishth

[11] 4,140,845

[45] Feb. 20, 1979

[54] CONTROL OF PROCEDURES FOR FORMATION OF WATER-IMMISCIBLE THERMOSETTING PHENOL-FORMALDEHYDE RESINS

[75] Inventor: Ramesh C. Vasishth, Delta, Canada

[73] Assignee: Cor Tech Research Ltd., Richmond, Canada

[21] Appl. No.: 779,621

[22] Filed: Mar. 21, 1977

[51] Int. Cl.$^2$ .............................................. C08G 8/08
[52] U.S. Cl. .................................. 528/139; 260/29.3; 528/142; 528/143; 528/144; 528/165; 528/140
[58] Field of Search ................. 260/57 A, 57 C, 57 R; 528/139, 144, 140

[56] References Cited

U.S. PATENT DOCUMENTS

| | | | |
|---|---|---|---|
| 2,658,054 | 11/1953 | Coleman et al. | 260/57 |
| 2,750,354 | 6/1956 | Merriam | 260/57 |
| 3,817,923 | 6/1974 | Ivanov et al. | 260/57 |
| 4,017,437 | 4/1977 | Vasishth et al. | 260/57 |
| 4,022,942 | 5/1977 | Anderson et al. | 260/29.3 |
| 4,036,816 | 7/1977 | Vasishth et al. | 260/57 |
| 4,045,411 | 8/1977 | Vasishth et al. | 260/57 |

FOREIGN PATENT DOCUMENTS 927041  5/1973  Canada.

*Primary Examiner*—Howard E. Schain
*Attorney, Agent, or Firm*—Sim & McBurney

[57] ABSTRACT

Water-immiscible thermosetting phenol-formaldehyde resins in which a large proportion of the linkages between the benzene rings are benzyl ether linkages located ortho to the phenolic hydroxyl groups are produced by reaction of at least 1 mole of formaldehyde with 1 mole of phenol in an aqueous reaction medium in the presence of a metal carboxylate catalyst, such as, zinc acetate, in two stages, in which, in the first stage exothermic addition of formaldehyde to phenol occurs and, in the second stage, methylol phenol is polymerized to form the resin. Methods for control of the rate of polymerization, methods of separation of product resin from aqueous phase, methods of molecular weight distribution control, a semi-continuous operation and an alternative polymerization procedure are described.

7 Claims, 4 Drawing Figures

FIG.1. INFLUENCE OF pH ON REACTION TIME

INFLUENCE OF pH ON THE RATE OF POLYMERIZATION

FIG.2.

FIG.3. INFLUENCE OF METHANOL CONCENTRATION ON RATE OF POLYMERIZATION

FIG.4. INFLUENCE OF CATALYST CONCENTRATION ON REACTION TIME

CONTROL OF PROCEDURES FOR FORMATION OF WATER-IMMISCIBLE THERMOSETTING PHENOL-FORMALDEHYDE RESINS

FIELD OF INVENTION

The present invention relates to the production of thermosetting phenol-formaldehyde resins.

BACKGROUND TO THE INVENTION

Conventional phenol-formaldehyde resins fall into two general classes, namely, the novolacs and the resoles. Novolacs are thermoplastic materials and require the addition of cross-linking agents, such as hexamethylene tetramine, for curing, whereas resoles are thermosetting materials.

Novolacs are produced by reacting less than 1 mole of formaldehyde per mole of phenol. In one process, the reaction is carried out under reflux conditions in a strongly acid medium. The product obtained has the structure:

(1)

This material contains methylene linkages which are randomly located ortho and para to the phenolic hydroxyl groups and no reactive end groups, so that the novolacs are thermoplastic and to use them as thermosetting materials, they are compounded with cross-linking agents.

In an alternative procedure for the production of novolac resins, phenol is reacted with formaldehyde in the presence of water soluble metal carboxylates as catalyst under mildly acid conditions. An intermediate of the following approximate structure is formed:

(2)

This intermediate contains benzyl ether linkages which are mainly ortho to the phenolic hydroxyl groups and is produced along with unreacted phenol.

The mixture of intermediate and unreacted phenol then is heated to a temperature above about 160° C. to produce a novolac resin having the structure of formula 1, except that the resin has mainly ortho substitution.

Resoles are prepared by reacting more than 1 mole of formaldehyde with 1 mole of phenol in an alkaline reaction medium. The resins produced have the approximate structure:

(3)

These materials contain methylene linkages which are randomly located ortho and para to the phenolic hydroxyl groups in the same way as the novolacs of formula 1, but contain reactive end groups, so that the resoles are thermosetting.

Phenol-formaldehyde resins of both types are extensively used industrially owing to their versatility, low cost, extreme stability to weathering, good adhesion to a variety of substrates and stability at relatively high temperatures in the fully cured state.

Resole resins of the above formula 3 in the uncured form have only a limited shelf life and other limitations which have lead to attempts to produce thermosetting phenol-formaldehyde resins of improved properties.

In Canadian Pat. No. 927,041, there is described a particular procedure for the production of thermosetting phenol-formaldehyde resins by reacting formaldehyde with phenol at a mole ratio of at least 1:1 in an essentially aqueous reaction medium in the presence of a water-soluble metal carboxylate catalyst while in copending U.S. application Ser. No. 779,622 filed Mar. 21, 1977, by Sim Y. Leong, Pitchaiya Chandramouli and Ramesh C. Vasishth entitled "Production of Thermosetting Phenol-Formaldehyde Resins" and assigned to the assignee of this application, there is described an alternative procedure for the production of the same resins.

The product resins formed by the procedures of Canadian Pat. No. 927,041 and the aforementioned copending U.S. application Ser. No. 779,622 have a long shelflife and are characterized by a structure in which a large proportion of the benzene ring linkages are benzyl ether linkages located ortho to the phenolic hydroxyl groups, i.e., a structure very similar to the intermediate of formula 2 formed in novolac production, that is, even when less than one mole of formaldehyde per mole of phenol is used.

Two distinct steps are required in the formation of resins of the resole type and of the latter type. The first step is the exothermic addition of formaldehyde to phenol to form methylol phenol ("methylolation") and the second step is the polymerization of the methyl phenol by condensation to form the thermosetting resin.

While the two steps are common to the two processes, the precise chemical reactions are quite different. Thus, while the addition of formaldehyde to phenol in the conventional resole process produces a randomly substituted ortho- and para-methylol phenol, the addition step in the procedures of Canadian Pat. No. 927,041 and the aforementioned U.S. application Ser. No. 779,622 produces mainly ortho-substituted methylol phenol. Similarly, while the polymerization step in the conventional resole process produces a product with methylene linkages between the benzene rings, the polymerization step in the procedures of Canadian Pat. No. 927,041 and the aforementioned U.S. application Ser. No. 779,622 produces a resin in which a large proportion of the methylene linkages are replaced by benzyl ether linkages. Since the chemical reactions occurring are different, the processing variables affecting one process do not necessarily affect the other process in the same manner.

In Canadian Pat. No. 927,041, it is recited that the procedure for the production of the resin must be carried out in a particular manner. Thus, it is said that it is essential to the process of Canadian Pat. No. 927,041 to carry out the process at a temperature between about 60° and about 80° C. during the initial exothermic reaction of formaldehyde with phenol in order to control and dissipate the considerable exotherm and prevent a runaway reaction. Once the exotherm has subsided, the reaction mixture is heated to about 90° to 100° C., typically at about 90° C., to carry out the polymerization step and form the desired product.

In contrast, in the procedure of the aforementioned application Ser. No. 779,622, the resin-forming process is carried out wholly at a temperature above about 90° C. up to the reflux temperature of the reaction medium by controlling the intensity of the initial exothermic reaction of formaldehyde with phenol.

SUMMARY OF INVENTION

The present invention is directed to various improvements and modifications in a process for the production of a water-immiscible thermosetting phenol-formaldehyde resin characterized by a large proportion of the linkages between benzene rings being benzyl ether linkages coated ortho to the phenolic hydroxyl groups by reacting formaldehyde with phenol at a mole ratio of at least 1:1 in an essentially aqueous reaction medium containing at least one water-soluble metal carboxylate catalyst for the reaction. The reaction is carried out, generally under agitation, in two stages wherein, in the first stage, exothermic methylolation of phenol by formaldehyde occurs and, in the second stage, polymerization of the methylolated phenol occurs at least until there separates from the reaction medium a water-immiscible thermosetting phenol-formaldehyde resin characterized by a large proportion of the linkages between benzene rings being benzyl ether linkages located ortho to the phenolic hydroxyl groups.

The process may be carried out in two steps as outlined in the aforementioned Canadian Pat. No. 927,041 or wholly at a temperature above about 90° C. as outlined in the aforementioned U.S. application Ser. No. 779,622.

GENERAL DESCRIPTION OF INVENTION

The mole ratio of formaldehyde to phenol used to form the thermosetting, water-immiscible resins in this invention is at least 1:1, generally up to about 3:1. Since the quantity of unreacted phenol after completion of the reaction has been found to be greater at lower mole ratios, it is generally preferred to use higher mole ratios, greater than about 1.5:1 up to about 3:1, such as, in the range of about 1.5:1 to about 2.5:1, and typically in excess of about 1.7:1, to achieve economic reactant utilization.

The metal carboxylate catalyst used to form the thermosetting water-immiscible resins in which a large proportion of the linkages between the benzene rings are benzyl ether linkages located ortho to the phenolic hydroxyl groups in this invention is a water-soluble salt of an organic monocarboxylic acid with a metal of the transition elements of the Period Table of Elements. Such salts may be represented by the formula:

$$(C_nH_{2n+1}COO)_xM$$

where n is an integer from 0 to 10, x is greater than 1 and M is a metal having an atomic number of from 21 to 30.

Typical acid moieties of the catalysts include formic acid, acetic acid and propionic acid. Typical metals include zinc, manganese, cobalt, nickel, iron and chromium. Zinc acetate and cobalt acetate are preferred.

DESCRIPTION OF SPECIFIC EMBODIMENTS OF INVENTION

A. FIRST EMBODIMENT - CONTROL OF RATE OF POLYMERIZATION

The first embodiment of this invention is directed to controlling the rate of the polymerization reaction to form the desired thermosetting, water-immiscible resin from the single phase aqueous system resulting from the methylolation reaction, i.e., after completion of the exothermic process. In the polymerization step, the aqueous medium is heated, preferably at its reflux temperature, until an immiscible resin phase separates from the aqueous phase. The polymerization reaction may be continued to increase the viscosity of the resin phase.

The water-immiscible resin is required to have a certain minimum viscosity for certain applications, the actual minimum viscosity value depending on the desired application of the resin. For the same reaction mixture concentration, the viscosity of the resin is a measure of its degree of polymerization and the time required to reach a certain viscosity depends on the rate of polymerization.

The following parameters may be varied, independently, or in combination, to achieve control of the rate of polymerization:

(a) pH of the aqueous medium;

(b) catalyst concentration in the aqueous medium; and (c) concentration of methanol in the aqueous medium.

The polymerization reaction may be carried out over a wide range of pH's from about 3 to about 6.9, preferably about 4 to about 6.5. Over this range of pH values, the rate of polymerization decreases with decreasing (i.e., more acid) pH values.

The pH range of about 3 to about 6.9 is critical to this embodiment of the invention. It is usually not possible to use a pH value above about 6.9 since the cation is precipitated from the aqueous medium above that pH value and becomes less effective.

At pH values more acid than about pH 3, the structure of the resin is quite different from that of the resin produced above this pH value, leading to different properties.

The concentration of catalyst used in the reaction mixture is at least about 1% by weight of the mixture. The rate of polymerization increases with increasing concentrations of catalyst, although the degree of increase in the rate decreases with increasing concentrations. It is preferred to use less than about 10% by weight of catalyst based on the weight of the aqueous medium, although quantities of catalyst up to about 20% by weight of the aqueous medium may be used.

Methanol concentration in the aqueous medium also affects the rate of polymerization. Increasing concentrations of methanol in the aqueous phase result in decreased reaction rate. The methanol concentration may be varied from 0 up to about 15% by weight of the aqueous medium. The methanol concentration in the aqueous phase may be provided by methanol content of the initial formaldehyde feed, by added methanol or by a combination of these sources.

The relevant parameters of the aqueous medium for carrying out the polymerization stage may be provided by the parameters of the initial reaction mixture and thus may be those of the aqueous medium resulting from the exothermic methylolation stage.

Alternatively, the parameters of the aqueous medium resulting from the exothermic reaction may be adjusted to the desired values for the polymerization reaction.

In the aforementioned copending application Ser. No. 779,622, there are described the parameters required for control of the exothermic methylolation stage to allow the process to be carried out wholly at a temperature above about 90° C. It is coincidental and sometimes convenient that the parameters which affect the polymerization rate are some of those that may be used to control the exotherm intensity, although the chemical reactions involved are different and in the one case, exotherm intensity tends to require quenching while in the other case, the polymerization rate tends to require accelerating by heating and the two may be controlled independently.

At any time after separation of the reaction mixture into the resin an aqueous phases, the immiscible resin phase may be removed from the aqueous phase. The viscosity of such removed water-immiscible resin then may be increased further in the absence of the aqueous phase by heating the resin at a temperature below the thermosetting temperature, generally at a temperature within the range of about 60° to about 120° C., higher temperatures leading to a more rapid increase in viscosity than lower temperatures.

In this way, it is possible to continue the polymerization reaction of the water-immiscible resin in the absence of the aqueous phase to the required viscosity value.

B. SECOND EMBODIMENT - PHASE SEPARATION

Following the formation of the resin and aqueous phases during the polymerization step and upon attaining of the desired viscosity in the presence of the aqueous phase or if it is desired to separate the resin phase for further polymerization in the absence of aqueous phase, the two-phase system is cooled while under agitation to stop the polymerization reaction. The resin and aqueous phases then are separated, and the aqueous phase discarded or recycled for use in a further batch operation.

Since agitation of the two-phase system assists in its rate of cooling and hence the speed at which the polymerization process can be stopped, it is preferable to continue agitation for as long as possible during the cooling operation.

If the agitation is continued to too low a temperature prior to phase separation, however, this has been found to lead to occlusion of the aqueous phase in the resin phase, as an emulsion, leading to difficulty in achieving a satisfactory high degree of separation of the resin and aqueous phases.

It has now been found that certain parameters of the process and the two-phase system affect the value of the temperature below which agitation should not be continued, if a high degree of separation of the aqueous and resin phases is to result upon phase separation.

The parameters affecting the lowest agitation temperature for acceptable phase separation, independently or in combination, are:

(i) pH of the two-phase system immediately prior to phase separation;
(ii) viscosity of the resin phase of the two-phase system; and
(iii) the solids concentration of the initial aqueous reaction mixture from which the two-phase system is formed.

In particular, it has been found that as the pH of the two-phase system increases, the minimum temperature increases. The two-phase system preferably has a pH of about 5 to about 6, due to considerations affecting the resin-forming process and phase separation may be facilitated by decreasing the pH of the system.

It has also been found that as the viscosity of the resin phase increases, the minimum temperature also increases. Additionally, as the solids concentration of the initial reaction mixture increases, the minimum temperature also increases.

Since the presence of occluded water in the separated resin phase represents a loss of catalyst, phenol and soluble low molecular weight materials from the system where the aqueous phase is to be recycled for use in a further batch operation, and may impair the performance of the resin in certain end uses, the ability to achieve controlled separation of aqueous and resin phases in accordance with this embodiment of the invention represents an important advance in this field.

Once the agitation of the two-phase system has ceased, the resin phase may be separated from the aqueous phase and the resin phase and, if desired, the aqueous phase thereafter may be cooled to room temperature, with or without the assistance of agitation by stirring.

In one procedure in accordance with this embodiment, the two-phase system may be cooled with agitation to the initial temperature, the resin separated from the aqueous phase and the pH of the separated resin phase decreased and the resin phase again separated from aqueous phase.

In an alternative procedure, once the agitation has ceased above the critical temperature, the two-phase system may be cooled to a lower temperature, without stirring or with a very mild stirring, prior to separation of the resin phase at that lower temperature.

C. THIRD EMBODIMENT - CONTROL OF MOLECULAR WEIGHT DISTRIBUTION

This third embodiment of the invention is concerned with controlling the molecular weight distribution of the polymeric species in the phenol-formaldehyde resin. The resinous product contains a number of species of differing molecular weights which contribute to the overall viscosity of the resin. The higher the proportion of low molecular weight species present in a particular resin, the lower will be the viscosity of the resin.

The distribution of differing molecular weight species in the resin affects the properties of the resin in its possible end uses. The ability to control the molecular weight distribution in accordance with this embodiment of the invention, therefore, allows the tailoring of the resin properties to the desired end use.

One particular procedure which may be used to result in a narrow range of high molecular weight resin species is to utilize a low overall solids concentration in the initial reaction mixture, the aqueous medium resulting from the exothermic methylolation or the two-phase resin and water system immediately prior to phase separation.

As the overall solids concentration of the reaction mixture decreases from about 70% by weight to about 20% by weight, the weight ratio of water to solids loaded changes quite considerably, as is shown by the following Table:

| Solids Concen. (wt.%) | Water (wt.%) | Ratio Wt. of H$_2$O to Wt. of solids loaded |
|---|---|---|
| 70 | 30 | 0.43 |
| 50 | 50 | 1.00 |
| 30 | 70 | 2.33 |
| 20 | 80 | 4.0 |

It has been found that, after phase separation, the aqueous phase contains a substantially constant concentration of unreacted phenol, and low molecular weight polymers, irrespective of the reaction mixture concentration.

Since the aqueous phase of the system contains only low molecular weight components of the resin, as the weight ratio of aqueous phase to solids increases, resins containing a lower proportion of lower molecular weight components are obtained. This effect is demonstrated by the fact that when the weight ratio of aqueous phase to solids loaded is increased from 1 to 4, a substantial increase in viscosity of resin is obtained in the same reaction period, but the yield of resin obtained based on percentage of solids loaded is substantially decreased.

The increase in viscosity of the resin product in the same reaction period is attributed to a higher proportion of high molecular weight species when the initial reaction mixture concentration is low as compared with the resin produced from the higher reaction mixture concentration, in view of the decreased yield, which indicates the presence of a higher proportion of a low molecular weight species in the aqueous phase, in the case of the low initial reaction mixture concentration.

Since the weight ratio of aqueous phase to solids loaded changes only to a small degree between 70 wt.% and 50 wt.% concentrations, the effect of changes in reaction mixture concentration on molecular weight distribution is considerably less marked than below 50 wt.% concentration.

The initial reaction mixture concentration, therefore, may be used to control the molecular weight distribution of the product resin. Since at higher ratios of weight of water to weight of solids loaded, more low molecular weight material is extracted into the water phase, the use of a higher water to solids ratio provides a narrower molecular weight distribution with a higher proportion of high molecular weight species in the resin phase. An equivalent effect may be obtained by diluting the reaction mixture at any time up to the removal of the resin phase from the two-phase system.

Dilution conveniently may be carried out by adding water to the reaction mixture after the exothermic methylolation is complete or immediately prior to the removal of the resin phase from the aqueous phase. an equivalent effect also may be obtained by washing the resin after its removal from the aqueous phase.

It has also been found that the temperature at which the resin phase is removed from the aqueous phase also affects the molecular weight distribution, lower temperatures tending to produce a broader spectrum of molecular weights than higher temperatures.

Additionally, the pH of the two-phase system immediately prior to separation of the resin phase from the aqueous phase affects the molecular weight distribution, more acid values tending to produce a broader spectrum of molecular weights than less acid values.

D. FOURTH EMBODIMENT - RECYCLE OF AQUEOUS PHASE

This fourth embodiment of the invention is directed to an economical semi-continuous or continuous batch resin-forming procedure, in which residual material in the aqueous phase resulting from one resin-forming reaction is used in a subsequent resin-forming reaction.

Following the phase separation of the resin phase from the aqueous phase, the catalyst contained in the aqueous phase may be reused by recycle of the aqueous phase. Since water also is introduced to the reaction medium with the formaldehyde, it is necessary to decrease the bulk of the aqueous phase recycle, if consistent conditions are to be provided in succesive batches. This bulk decrease may be achieved by discarding part of the aqueous phase or preferably by concentrating the same. Such a recycle system is desirable since continuous utilization of one charge of catalyst in successive batches is achieved thereby, and unreacted phenolics and low molecular weight species are reacted in the next batch.

Repeated recycle of the aqueous phase has resulted in an observed step-wise decrease in the pH of the reaction medium, which leads to a decreased exotherm intensity and increased reaction time with each successive recycle. In accordance with this embodiment of the invention, in order to maintain consistent conditions in a series of batch procedures, the portion of the aqueous phase recycled has its pH adjusted to the pH of the reaction medium, or the pH of the reaction medium itself is adjusted to the desired value after formation thereof from the recycled material.

Some zinc acetate or other catalyst may be lost from each successive batch, and suitable compensation is required to maintain consistent conditions in successive batches.

E. FIFTH EMBODIMENT - MODIFIED RESIN-FORMING PROCEDURE

This fifth embodiment of the invention is directed to a modification of the procedure for forming the resin. In the conventional operation, the polymerization reaction is carried out at an elevated temperature, preferably at the reflux temperature of the reaction medium, at least until a resin phase separates from the aqueous phase and usually until the resin phase has achieved the desired viscosity.

In this embodiment of the invention, prior to phase separation, the aqueous medium is cooled to induce phase separation, the low molecular weight resins being less soluble at the lower temperatures. The very low viscosity material thus obtained is removed from the aqueous phase and heated at a temperature below its thermosetting temperature, generally at a temperature in the range of about 60° to about 120° C., to the desired viscosity.

Although when the above procedure is used the yield of resin obtain is decreased as compared to the conventional operation, an overall time saving may be effected for a series of batch operations. Thus, once the resin phase is removed from the aqueous phase, the aqueous phase containing unreacted material, soluble resin and catalyst may be immediately recycled for use in the next batch, after suitable concentration, so that the next batch may commence resin formation while the resin from the first batch is polymerized to the required viscosity. Since temperatures higher than normal reflux temperature may be used in the polymerization step, the rate of polymerization may be increased as compared with the conventional process.

These two factors combine to provide a rapid operation for the production of large quantities of resin of desired viscosity in a series of batch operations.

EXAMPLES

EXAMPLE 1

This example illustrates the formation of a water-immiscible phenol-formaldehyde resin using the procedure of the present invention.

In a glass reaction vessel equipped with an agitator, reflux condensor and a thermometer were charged 1,566.2 gms (16.66 moles) of phenol, 2,150.5 gms (33.3 moles) of 46.5 wt.% formaldehyde, 134 grams of zinc acetate dihydrate, 1,149 grams of water and methanol to provide a reaction mixture having a total reactants concentration of 54% by weight, catalyst concentration of 2.68 weight %, methanol concentration of 2.26% and a phenol to formaldehyde mole ratio of 1:2. The pH of the reaction mixture was found to be 5.8.

The mixture was heated to 90° C. in about 40 to about 45 minutes. The temperature was raised further to reflux at approximately 100° C. over the next 15 minutes by controlling the state of heating. The reaction mixture was kept under constant reflux for a total time, from commencement of the reflux of 280 minutes. About 147 minutes after commencement of the reflux began, a distinct phase separation was observed.

After the completion of the reflux period, the reaction mixture was cooled to 50° C. and the agitation stopped. Cooling was then continued to about 25° C. The liquid resin phase was separated from the aqueous phase. The resin was found to have a Brookfield viscosity (No. 2 spindle) of 1400 cps at 50° C. and an N.V. solids content of 84%.

Infra-red and NMR spectral analysis indicated the resin to contain benzyl ether linkages ortho to the phenolic hydroxyl groups and large quantities of hemiformal groups.

EXAMPLE 2

This Example shows the variation in rate of polymerization with pH of the aqueous medium.

The procedure of Example 1 was repeated until phase separation was observed and samples of the reaction mixture were withdrawn at different times up to the end of the reaction. The resin phase of each sample was separated while the mixture was hot, cooled to 50° C. and its viscosity at 50° C. determined using a Brookfield Viscometer and a No. 2 spindle.

The procedure was repeated for differing pH values from 4.8 to 5.9 for the initial reaction mixture and in each case the time from commencement of reflux to phase separation and to a viscosity of about 1000 cps at 50° C. were recorded, along with the viscosity of the resin samples at specific times.

Figure 1:
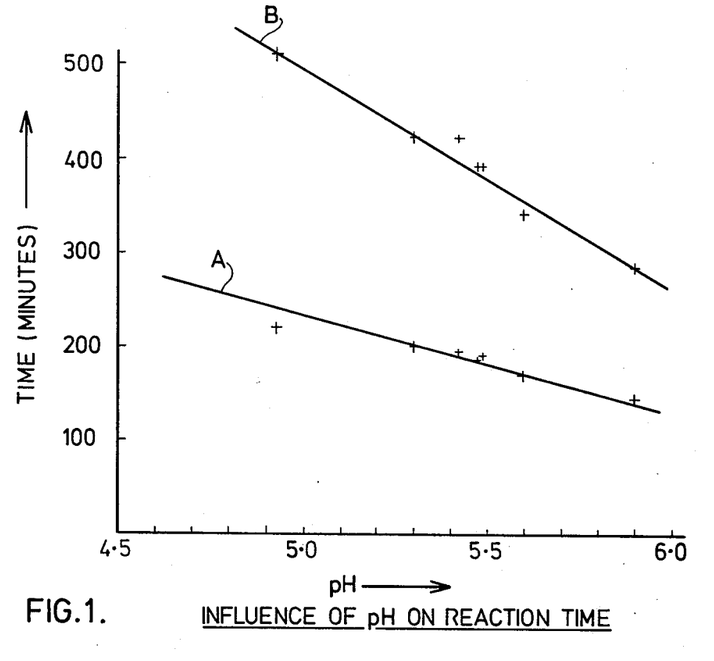
FIG. 1 is a graphical representation of variations of reaction times to phase separation (A) and total reaction times to a given end viscosity (B) with pH.

The times to phase separation and end viscosity of 1000 cps at 50° C. at each pH value were plotted graphically and appear as curves A and B respectively on FIG. 1 of the accompanying drawings.

Figure 2:
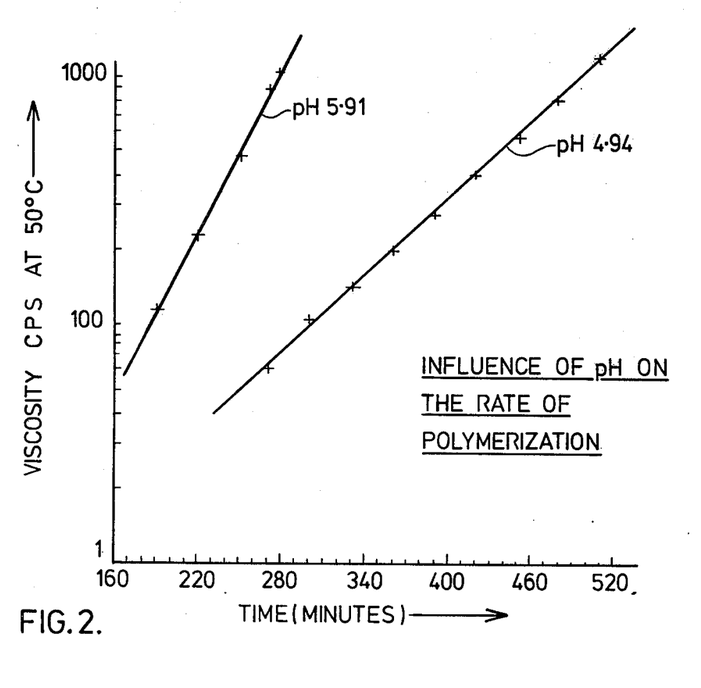
FIG. 2 is a graphical representation of the log of viscosity versus reaction time at various pH values.

For two of the pH values, a plot of log of viscosity against time was made and these results appear as FIG. 2 of the accompanying drawings.

It will be seen from FIGS. 1 and 2 that as the pH decreases, the rate of polymerization decreases as is shown by increased time to phase separation, increased time required to reach a set end viscosity and a decreased rate of increase in viscosity with time of reaction, with decreasing pH.

EXAMPLE 3

This example illustrates the change of polymerization rate with methanol concentration of the reaction medium.

The procedure of Example 1 was repeated using formaldehyde containing varying quantities of methanol and viscosity determinations at various times were made using the procedure as described in Example 2.

Figure 3:
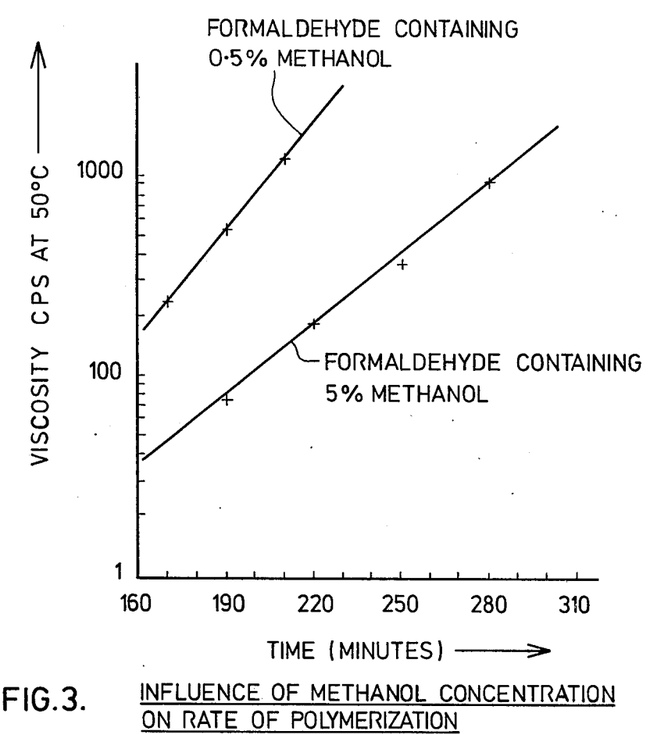
FIG. 3 is a graphical representation of the log of viscosity versus reaction time at various methanol concentrations.

The results, expressed as log of viscosity in cps at 50° C. against time were plotted graphically and appear as FIG. 3 of the accompanying drawings. These results show that the rate of viscosity increase decreases with increasing methanol concentration and hence increasing methanol concentration decreases the polymerization rate.

EXAMPLE 4

This example illustrates the change in polymerization rate with catalyst concentration of the reaction mixture.

The procedure of Example 1 was repeated using varying catalyst concentrations in the initial reaction mixture and the time required for the resin phase to reach a viscosity of about 1000 cps determined at 50° C. was noted. These figures were plotted graphically and appear in FIG. 4 of the accompanying drawings.

Figure 4:
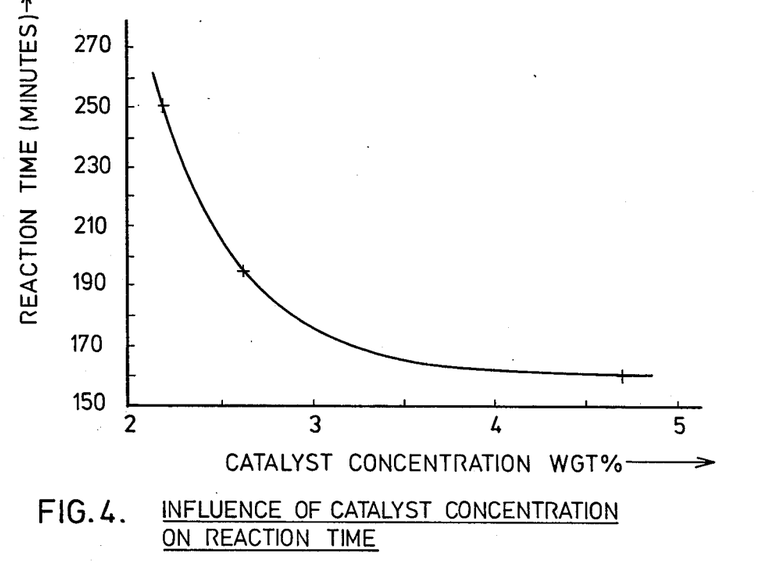
FIG. 4 is a graphical representation of the variation in reaction time to a given end viscosity with catalyst concentration.

The results shown in FIG. 4 demonstrate that the rate of polymerization increases with increasing catalyst concentration and that the effect of increasing catalyst concentration on rate of polymerization falls off rapidly above about 4-5% by weight of catalyst.

These results demonstrate that variation of the parameters of pH, catalyst concentration and methanol concentration of the aqueous phase which is refluxed to achieve polymerization independently affect the rate of polymerization.

EXAMPLE 5

This example shows the variation of phase separation temperature with parameters of the two-phase system.

Following the procedure of Example 1, resins were produced of approximately 1000 cps viscosity determined at 50° C. under different initial reaction conditions. Another resin of approximately 3000 cps viscosity determined at 50° C. also was formed following the procedure of Example 1.

For each resin, phase separation of resin phase from aqueous phase was effected by stopping agitation at three different temperatures, namely 90° C., 40° C. and 25° C. In each case, the non-volatile content of the resins was determined to find the degree of water entrapment and hence the efficiency of resin/water separation.

The results are reproduced in the following Table I:

TABLE I

| Resin Viscosity cps at 50° C (approx) | Initial Reactants Concentration % by weight | pH of reaction mixture | Temperature at which Agitation is Discontinued | Non-volatiles in Resin (% solids) |
| --- | --- | --- | --- | --- |
| 1000 | 54 | 4.5 | 25 | 75 |
| | | | 40 | 80 |
| | | | 90 | 81.5 |
| 1000 | 54 | 5.8 | 25 | 69 |
| | | | 40 | 80 |
| | | | 90 | 82 |
| 1000 | 54 | 6.9 | 25 | 60 |
| | | | 40 | 65 |
| | | | 90 | 72 |
| 3000 | 54 | 5.8 | 25 | 61 |
| | | | 40 | 78 |
| | | | 90 | 81.9 |
| 1200 | 65 | — | 80 | 75.7 |
| | | | 95 | 82.5 |

In parallel tests, similar results were found if the agitation was substantially reduced rather than completely stopped.

The results of the above Table I show that to achieve consistent and lower non-volatile content in the resin and hence better phase separation, the temperature at which agitation should be stopped is higher for higher pH values, higher viscosities and higher reaction mixture concentration.

EXAMPLE 6

This example shows the variation of phase separation with pH change of the two-phase system.

The procedure of Example 1 was repeated at a pH of 6.9 to produce a resin of viscosity of about 1000 cps at 50° C. The reaction mixture was cooled to 90° C. and enough 1:1 sulphuric acid added to lower the pH to 2.8. The mixture immediately separated into two phases. The mixture was cooled with agitation to 50° C. and, with agitation discontinued, the mixture was cooled further to 25° C. The resin was found to have an N.V. content of 81.8%, indicating that phase separation was facilitated by lowering the pH of the reaction mixture after completion of the reaction.

EXAMPLE 7

This example shows increase in the viscosity of the resin in the absence of the aqueous phase.

A resin was produced following the procedure of Example 1, except that on attaining phase separation, the aqueous phase is removed and the low viscosity very mobile resin was heated in the absence of the aqueous phase at about 100° C. to produce a resin having a viscosity of about 1000 cps at 50° C. The latter resin was found to have an infra-red spectrum essentially the same as a resin of the same viscosity produced in the presence of the aqueous phase.

EXAMPLE 8

This example illustrates control of the molecular weight distribution of the resin.

A resin was prepared following the procedure of Example 1 to an approximate viscosity of 1000 cps at 50° C. At the reflux temperature and in the presence of the aqueous phase at about 54% concentration of resin phase to aqueous phase, boiling water was added to decrease the ratio of resin phase to aqueous phase concentration to about 30%. After bringing the mixture back to reflux, the mixture was cooled to 25° C., the agitation having been stopped at 50° C., and the two phases separated. The viscosity of the resin phase was determined and found to be 7000 cps at 50° C.

Two parallel experiments were conducted using the procedure of Example 1 to form resins from reaction mixtures in one case having a total reactants concentration of 54% by weight and in the other case having a total reactants concentration of 20% by weight. When the reaction mixture concentration of 20% was used the amount of catalyst and methanol used was adjusted to maintain a catalyst concentration of 2.68% and a methanol concentration of about 2.26% on total reaction mixture weight. In each case, the total reaction time was about 270 minutes. The viscosities of the resins and their yeild in terms of the percentage of solids loaded were determined. The results are reproduced in the following Table II:

TABLE II

| Initial Solids Concentration % by weight | Weight Ratio ( Aqueous phase / Solids loaded ) | Viscosity of resin phase cps at 50° C | Resin Yield % by weight of solids loaded |
| --- | --- | --- | --- |
| 54 | 0.85 | 1000 | 86 |

TABLE II-continued

| Initial Solids Concentration % by weight | Weight Ratio (Aqueous phase / Solids loaded) | Viscosity of resin phase cps at 50° C | Resin Yield % by weight of solids loaded |
|---|---|---|---|
| 20 | 4 | 6000 | 50 |

The results of the above Table II show that a dramatic increase in viscosity of resin product can be obtained in the same reaction time by significantly decreasing the solids concentration thereby to increase substantially the weight ratio of aqueous phase to solids loaded.

It may be thought that these results indicated an increased rate of polymerization with decreasing initial reactants concentration, but the yield of resin obtained showed this not to be the case. Where the solids concentration is high, the yield of resin in terms of a percentage of total solids loaded also is high, while at the lower concentration, the yield also is low.

The low yield is attributed to the extraction of a relatively large quantity of low molecular weight species into the aqueous phase, whereas in the case of the higher concentration reaction, more of these low molecular weight species are present in the resin phase. It is the presence or absence of the low molecular weight species in the resin phase which results in the dramatic difference in the resin viscosity.

Similarly, in the case of dilution of the reaction mixture at the reflux, the resulting increase in viscosity of the resin product is attributed to dissolving of low molecular weight material from the resin phase.

EXAMPLE 9

This example illustrates the effect of continued recycle of aqueous phase on pH of reaction mixture.

Using the procedure of Example 1, a resin was made in a 20 gallon pilot reactor to a final viscosity of about 1000 cps at 50° C. from an initial charge of 21,203 g of phenol, 12,192.5 g of formaldehyde (added as a 47% aqueous solution thereof), 1,711.3 g of zinc acetate and 33,504 g of water. This reaction mixture had a pH of 5.9.

At the end of the reaction, the mixture was cooled to 50° C. and the two phases separated. The aqueous phase was then concentrated to two-thirds of its original volume by distillation. The aqueous concentrate was analyzed and found to contain 2,223.7 g of phenol and low molecular weight soluble phenolics, 1,564.5 g of zinc acetate and 9,887.8 g of water.

A new reaction mixture was then made up using 18,979.3 g of phenol, the equivalent of 12,192.5 g of formaldehyde at 37% concentration, 147 g of zinc acetate make up, the concentrated aqueous phase and sufficient water to obtain a reactants concentration of 54%. The reaction mixture has the same concentration of individual reactants as the first reaction mixture. The pH of the new reaction mixture was determined and found to be 5.6.

The new reaction mixture was again polymerized according to the procedure of Example 1 to produce a resin having an approximate viscosity of 1000 cps at 50° C., the aqueous phase was separated, concentrated, and analyzed and a new reaction mixture was made up to contain the same initial concentration of individual reactants. The pH of this reaction mixture was determined and found to be 5.43.

The recycle procedure was repeated two more times, after which the pH was found to be 4.94. The pH of the reaction mixture, therefore, decreased with each recycle. It has already been shown in Example 2 that the rate of polymerization decreases with decreasing pH and this was borne out in these tests wherein the reaction time required to reach the viscosity of 1000 cps at 50° C. increased with each recycle.

The results in this Example show that if recycle aqueous medium is to be used to achieve economic utilization of the aqueous phase contents, then, in addition to make up of reactants and catalyst, the pH of the system must be adjusted to control the total reaction time.

EXAMPLE 10

This example illustrates an alternative resin forming procedure.

The procedure of Example 1 was repeated, except that after about 60 minutes from reaching the reflux temperature, the reaction mixture was cooled to about 25° C. and the reaction mixture separated into two phases. The aqueous phase was removed and the resin phase was found to have a viscosity only slightly greater than that of water. On further heating of the resin phase at about 90° C., the resin was observed to gain in viscosity and some addition water was occluded as the reaction proceeded. This procedure may be used to form a resin of any desired viscosity by controlling the temperature and length of time of heating after phase separation.

EXAMPLE 11

This example illustrates the thermosetting nature of the resins produced in this invention.

A series of resins were prepared following generally the procedure of Example 1 at varying mole ratios of formaldehyde to phenol of 1.1:1 to 3:1 and varying initial reaction mixture compositions to various end viscosities.

In each case, the resin was found to be thermosetting, as shown by its conversion to a brittle insoluble state in a short period of time when placed on a hot plate at 160° C.

SUMMARY

The present invention, therefore, provides various improvements in and modifications to the production of water-immiscible thermosetting phenol-formaldehyde resins which are characterized by a large proportion of the benzene ring linkages being benzyl ether linkages located ortho to the phenolic hydroxyl groups. Modifications are possible within the scope of this invention.

What I claim is:

1. In a process for the production of a water-immiscible thermosetting phenol-formaldehyde resin characterized by a large proportion of the linkages between benzene rings being benzyl ether linkages located ortho to the phenolic hydroxyl groups, by reacting formaldehyde with phenol at a mole ratio of at least 1:1 in an essentially aqueous reaction medium containing at least one water-soluble metal carboxylate catalyst for the reaction, in two stages, wherein, in the first stage, exothermic methylolation of phenol by formaldehyde occurs and, in the second stage, polymerization of the methylolated phenol occurs at least until there separates from the reaction medium a water-immiscible thermosetting phenol-formaldehyde resin characterized by a large proportion of the linkages between benzene rings being benzyl ether linkages ortho to the phenolic hydroxyl groups, and recovering the resin phase from the aqueous phase, the improvement which comprises utilizing at least part of the aqueous phase remaining after recovery of said resin phase to provide part of the aqueous medium of a subsequent resin-producing process, and adjusting the pH of said at least part or said subsequent aqueous medium to achieve a pH value in said subsequent aqueous medium substantially equal to that of said aqueous medium.

2. The process of claim 1 wherein substantially all of said aqueous phase is utilized to provide said subsequent reaction medium and said aqueous phase is concentrated prior to combination with the reactants for said subsequent resin-producing process to provide with the reactants a total solids concentration of about 45 to about 58% by weight in said subsequent reaction medium.

3. The process of claim 2, wherein said said total solids concentration in said subsequent reaction medium is about 52 to about 56% by weight.

4. The process of claim 1, wherein said first and second stages are carried out wholly at a temperature above about 90° C.

5. The process of claim 1, wherein said first stage is carried out at a temperature of about 60 to about 80° C. and said second stage is carried out at a temperature above about 90° C.

6. The process of claim 2, including adjusting the catalyst concentration of said subsequent reaction medium substantially to that of the initial reaction medium to compensate for minor losses of catalyst from the initial reaction medium and hence not present in the recycled aqueous phase.

7. The process of claim 1 wherein said mole ratio of formaldehyde to phenol is from about 1.5:1 to about 2.5:1.

* * * * *